April 30, 1935.  R. C. HULBERT  1,999,459
RUMBLE SEAT ENCLOSURE
Filed May 10, 1934  4 Sheets-Sheet 1

Inventor
Roy C. Hulbert,
By Clarence A. O'Brien
Attorney

April 30, 1935.   R. C. HULBERT   1,999,459
RUMBLE SEAT ENCLOSURE
Filed May 10, 1934   4 Sheets-Sheet 2
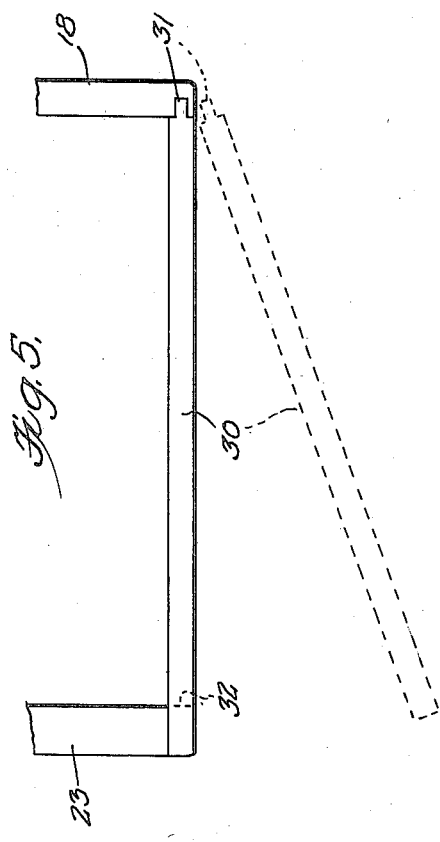
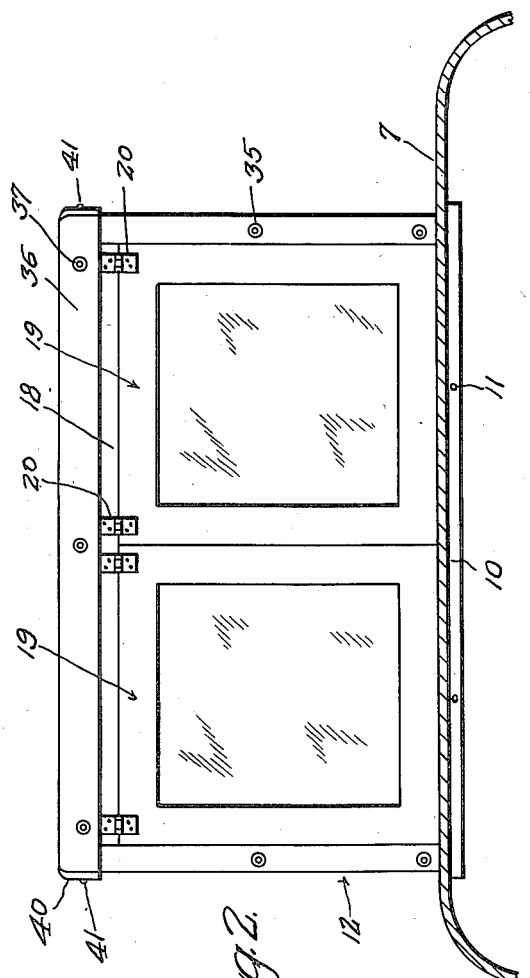
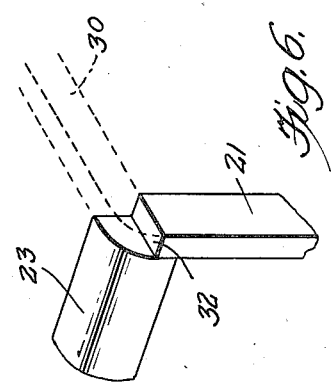
Inventor
*Roy C. Hulbert,*
By *Clarence A. O'Brien*
Attorney

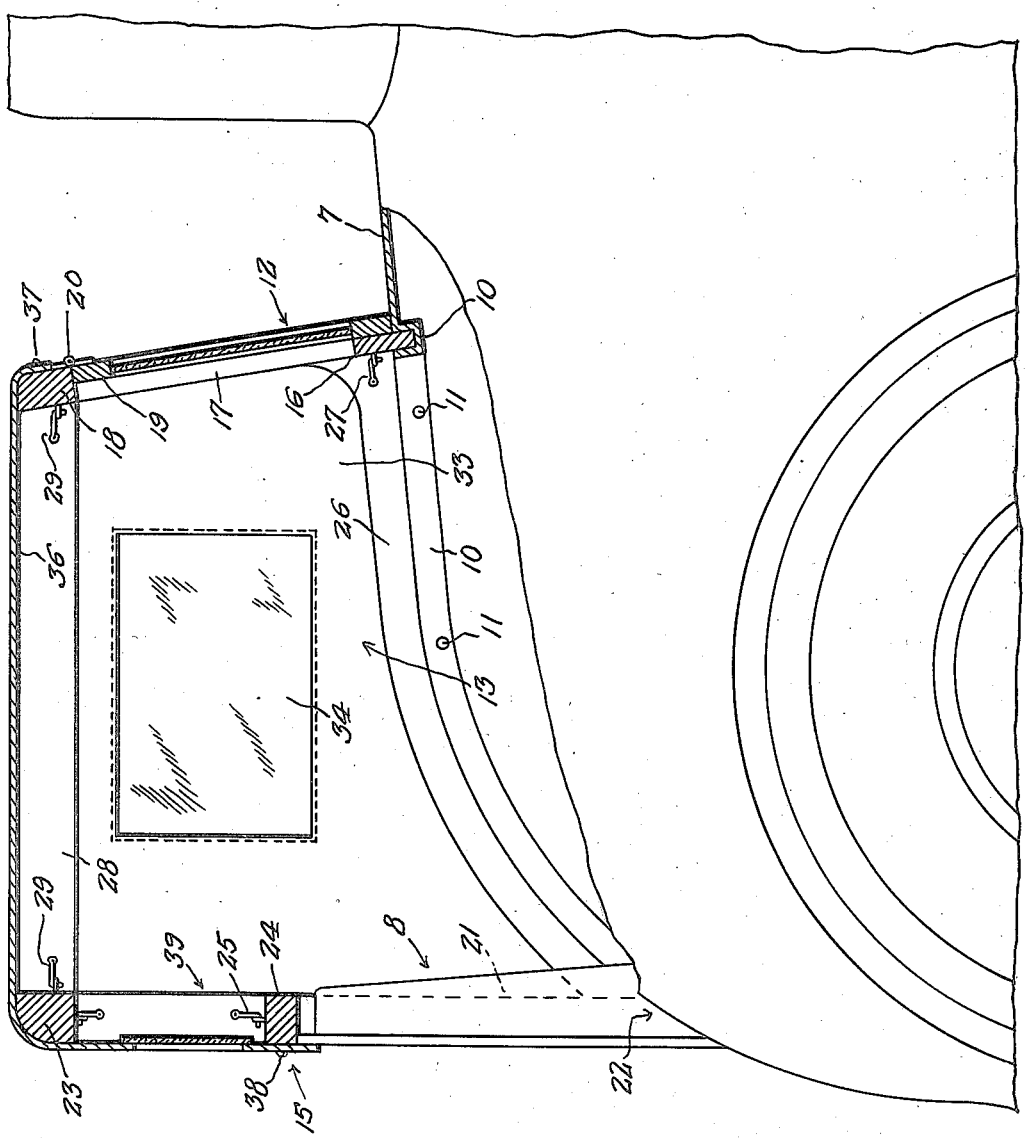

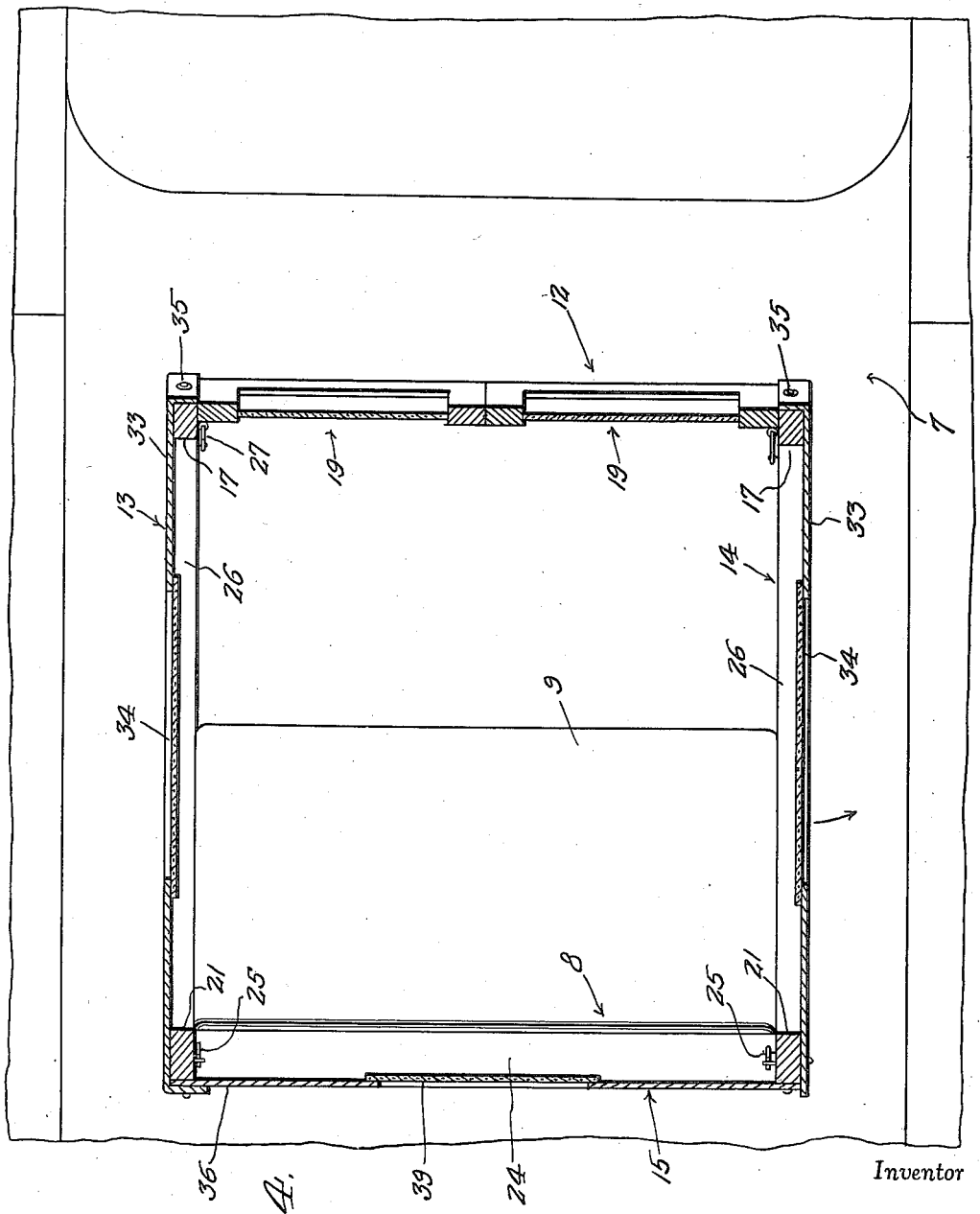

Patented Apr. 30, 1935

1,999,459

UNITED STATES PATENT OFFICE 1,999,459

RUMBLE SEAT ENCLOSURE

Roy C. Hulbert, Irvington, N. J.

Application May 10, 1934, Serial No. 724,981

1 Claim. (Cl. 296—99)

This invention relates to that class of inventions embodying covering, canopies and analogous protective enclosures for the occupants of rumble seats such as are used in present day automobile constructions.

Needless to say I am aware of the fact that various forms and structures have been devised and utilized in this line of endeavor. Therefore, my primary aim is to generally improve upon known prior patented and marketed structures of this class by providing an arrangement characterized by appreciative constructional differences and other features and refinements calculated to better fulfill the requirement of an invention in this classification.

In carrying the principles of the present inventive conception into actual practice I have evolved and produced an assemblage characterized by a plurality of complemental walls and a covering top therefor wherein said walls are of composite knockdown type and provided with individual transparencies whereby to permit the occupant to be effectively shielded from the elements and to at the same time afford proper facilities for clear vision.

Stated more explicitly the preferred embodiment of the invention embodies a slightly inclined frontal section or wall including a frame having hinged windows susceptible of being conveniently opened so that the occupants of the rumble seat may conveniently converse with the occupants of the main seat of a coupe.

A further feature is predicated upon a double window front wall unit which is constructed so as to permit it to be used independently of the remaining curtain equipped wall, that is to be employed as a wind breaker or shield when the remainder of the structure is not needed.

A further feature of the construction is predicated upon the adoption and use of curtain carrying frame composed of separately connected frame bars capable of being collapsed into a small compass to provide a convenient package for expeditious handling and safe storage in an out of the way position in the rumble seat compartment.

Other features and advantages will become more readily apparent from the following description and drawings.

In the drawings:

Figure 2 is a vertical view taken approximately on the plane of the line 2—2 of Figure 1.

Figure 3 is a vertical longitudinal sectional view through the structure depicting the internal details and relative arrangement and association of parts.

Figure 4 is a horizontal sectional view.

Figure 5 is a fragmentary detail elevational view.

Figure 6 is a corner perspective view showing certain essential parts.

Figure 1:
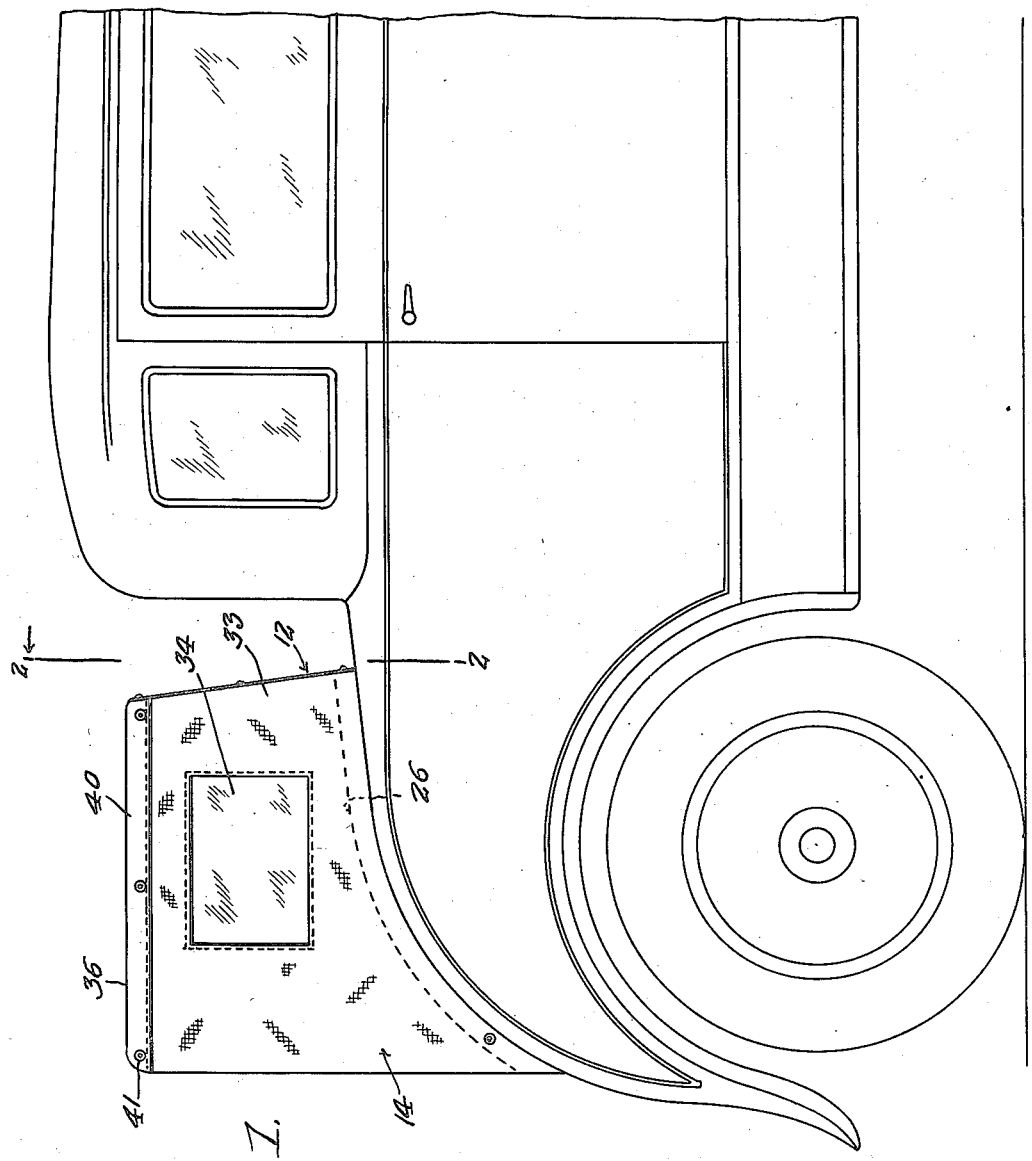
Figure 1 is an elevational view showing the rear portion of a coupe with the rumble seat enclosure erected for usage.

Referring to Figure 4 of the drawings it will be observed that the rear portion or shell of the body of the car which is fashioned to accommodate the usual rumble seat construction is denoted by the numeral 7 and this is of customary construction and design. The rumble seat cover is indicated at 8 and the customary seat or cushion is denoted at 9. As shown in Figure 3 there is a marginal channel indicated at 10 which serves to accommodate the rim portion of the closure or cover 8 to provide the requisite weatherproof joint. Advantage of this particular feature is taken so as to accommodate portions of the frame structures which make up sections or walls of the rumble seat cover or enclosure. Incidentally I have found it expedient and practical to provide pin holes as indicated at 11 to accommodate removable pins (not shown) such as may be utilized to hold the adjacent bars of the frame structure in this channel temporarily that is when the cover 8 is up and the closure is erected to serve as a housing for the occupants of the rumble seat.

As before indicated the enclosure embodies a front section or wall 12 (see Figure 4), a pair of opposed sides or walls 13 and 14 and a rear section or wall 15. This front section 12 as shown in Figure 3 comprises a rectangular frame embodying a bottom bar 16 fashioned to fit removably down in the adjacent receptive channel 10. This is fastened at its ends rigidly between uprights or end bars 17 which are connected at their upper ends to a top rail or cross piece 18. I provide a pair of duplicate windows 19 which fit into the frame and which are hingedly attached as at 20 to the top rail 18. As before stated these windows serve to permit the occupants of the enclosure to raise the windows and to carry on a conversation with the occupants of the main or front seat in the car. It is also evident that this window equipped frame is in effect an auxiliary windshield and can be used separately and independently of the remaining parts forming the enclosure.

Referring now to the back section of the structure, that is the section opposed to the front 12 and identified as a unit by the numeral 15 it will be observed that this is so made as to accommodate and fit around the seat cover 8. It is composed essentially of a sectional frame. The frame embodies a pair of vertical posts 21 of a length to extend down into the spaces 22, that is the existing clearance spaces between the shell 7 and the hinged rim portion of the cover 8. Moreover the posts extend above the cover 8 when it is up as shown in Figure 3. Attached between the upper extending end portions is a horizontal top rail 23 and located beneath this in horizontal spaced parallelism there is a brace 24. These are removably secured to the posts by hook and eye fasteners indicated at 25. This provides the requisite knock-down or sectional frame structure.

The longitudinal side sections are more or less identical in construction but are distinguished by the numerals 13 and 14 respectively. The section 13 is a relatively stationary section while the one indicated at 14 serves as a sort of a door or closure whereby the occupants may get in and out of the rumble seat and beneath the enclosure without collapsing the enclosure. Each of the sections 13 and 14 include a lower frame rail 26 which is shaped to correspond to the contour of the sheet metal shell 7 and to fit into the correspondingly shaped channel 10. These are secured by hook and eye fasteners 27 to the front and rear sections 12 and 15. That is to say the forward ends are removably attached to the frame of the section 12 and the opposite ends are secured to the posts or uprights 21.

The upper rail of the stationary side 13 is differentiated by the numeral 28 and is fastened between the top rails 18 and 23 by hook and eye fasteners as indicated at 29. The corresponding rail of the closure forming or opposed section 14 is denoted by the numeral 30. One end thereof is provided with a tenon 31 fitting into a mortise in the adjacent end of the rail 18. The opposite or rear end portion of this top rail 30 rests removably upon the upper end of the adjacent post 21 as shown in Figures 5 and 6. This post, it will be noticed terminates short of the rail 23 so as to provide a notch as at 32 which accommodates this end portion of the rail 30. The fabric covering for each of the sections 13 and 14 is indicated as at 33 and is provided with a cellulose sheet material window light or window 34. These fabric window equipped curtains are slipped over the adjacent frames and secured down by snap fasteners 35.

I next call attention to the strip of fabric denoted by the numeral 36 in Figure 3. This forms the top and is buttoned or fastened down as at 37 on the top rail 18 and stretched across the other rail 28, 30 and 23 then stretched down over the rear frame structure and fastened in place as indicated at 38. The latter end portion is provided with a window 39. The longitudinal edge portions are drawn over to form side flaps as indicated at 40 and secured in place by fasteners 41.

The gist of the invention is found is an unique assemblage of parts characterized by the foldable frame structures and the collapsible fabric window equipped coverings therefor all of which are coordinated to provide a simple and economical enclosure for the occupants of the rumble seat.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

Having thus described my invention, what I claim as new is:

A removable top for rumble seats comprising a pair of spaced upstanding rear supports, a pair of spaced upstanding front supports, removable bars connected to the upper portion of said supports, said bars being removably connected by means of hooks and eyes, and side bars connecting the lower portion of the side support, said side bars being of the general shape of the contour of the rear portion of the motor vehicle and removably connected by means of hooks and eyes.

ROY C. HULBERT.